UNITED STATES PATENT OFFICE.

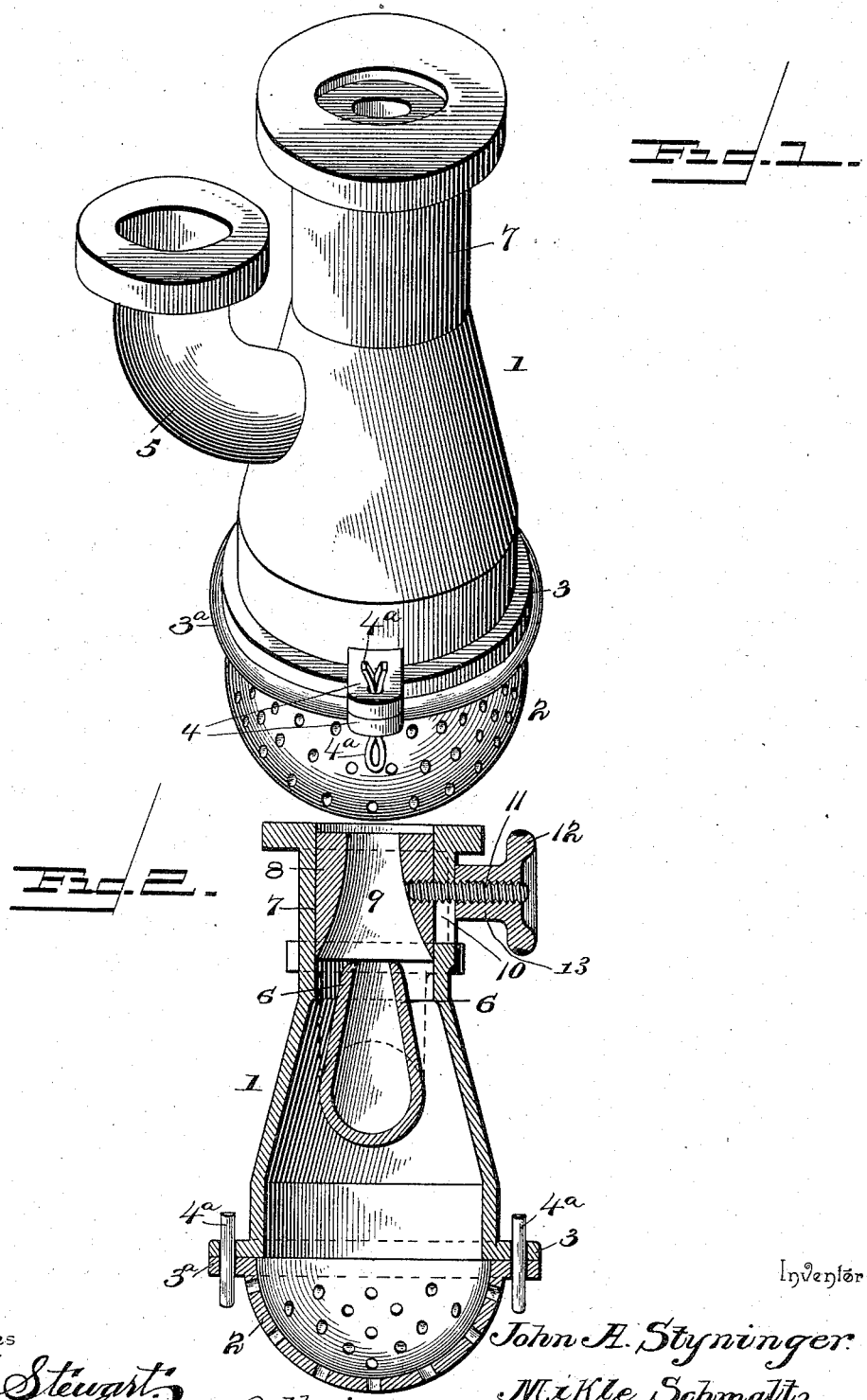

JOHN A. STYNINGER AND MIKLE SCHMALTZ, OF BAY CITY, MICHIGAN.

STEAM-SIPHON.

SPECIFICATION forming part of Letters Patent No. 535,869, dated March 19, 1895.

Application filed November 14, 1894. Serial No. 528,806. (No model.)

*To all whom it may concern:*

Be it known that we, JOHN A. STYNINGER and MIKLE SCHMALTZ, citizens of the United States, residing at Bay City, in the county of Bay and State of Michigan, have invented a new and useful Steam-Siphon, of which the following is a specification.

This invention relates to steam siphons; and it has for its object to provide certain improvements in steam siphons of that character which are employed in draining water and conveying the same to any desired point, while at the same time constructing a siphon which may be used in a variety of ways and in connection with different apparatus for elevating or transferring liquids generally.

To this end the invention primarily contemplates certain specific improvements in steam siphons, whereby the same can be readily adjusted according to the pressure of steam employed, so that the same will be rendered especially efficient in operation.

With these and other objects in view, which will readily appear as the nature of the invention is better understood, the same consists in the novel construction, combination and arrangement of parts hereinafter more fully described, illustrated and claimed.

In the drawings: Figure 1 is a perspective view of a steam siphon constructed in accordance with our invention. Fig. 2 is a central vertical longitudinal sectional view thereof.

Referring to the accompanying drawings, 1 designates a conical siphon bowl or casing which is imperforate and is provided at its upper discharging end with a substantially cylindrical discharge throat 7, which is adapted to be coupled to a line of piping through which the water lifted by the siphon is to be conveyed to the point of discharge, and the lower larger end of the siphon bowl or casing 1, is provided with an off-standing securing flange 3, adapted to register with a corresponding flange 3ª, surrounding the upper edge of the semi-spherical perforated strainer cap 2. The meeting flanges 3 and 3ª of the siphon bowl or casing 1, and the semi-spherical or rounded cap 2, are provided at intervals perforated with lugs 4, which are adapted to receive split pins 4ª, or other suitable securing devices for detachably connecting the cap 2 to the body of the siphon bowl or casing. The semi-spherical or rounded strainer cap 2 is minutely perforated, and is adapted to be submerged in the water or other liquid to be lifted or conveyed by the siphon, and not only serves to strain the water or liquid being raised, but at the same time provides means for gaining ready access to the interior of the bowl or casing, which latter and the said cap are preferably cast.

At a point intermediate of its ends the siphon bowl or casing 1, is provided with an integral branch injector pipe 5, the outer end of which, outside of the bowl or casing, is adapted to be coupled to a live steam pipe leading from a suitable supply, so as to provide means for injecting the live steam into the siphon bowl or casing, and the inner end of said branch pipe 5, terminates inside of the bowl 1, in a conical upwardly disposed jet tube or nozzle 6, the center of which is coincident with the center of the cylindrical throat 7. The upwardly disposed conical jet tube or nozzle 6 of the branch pipe 5 is designed to jet steam into the vertically adjustable cylindrical throat block or combining cone 8. The vertically adjustable throat block or combining cone 8 is designed to snugly fit the interior bore of the throat 7, and is provided with a conical bore 9, flared toward the conical jet tube or nozzle 6, and combining with the conical exterior periphery of the jet tube or nozzle to form a passage for the water or other liquid lifted by the action of the steam jetted into the throat of the bowl or casing.

It will be apparent that the vertical or longitudinal adjustment of the conically bored throat block provides means whereby the same can be readily adjusted to be accommodated to the pressure of steam employed to insure the effective siphoning of the water, and to provide for the positive adjustment of the said throat block or combining cone, the same has secured to one side thereof the inner end of the threaded stud 11, projecting through and working in a longitudinally disposed slot 10 formed in the throat of the siphon bowl or casing, and which slot is always covered at its inner side by said throat block. The outer side of the threaded stud 11, is adapted to be engaged by a milled hand wheel 12, which is provided with a threaded nut 13, adapted to be run down on the threaded stud and bind at its inner end against the exterior of the siphon throat so as to hold the throat block or combining comb stationary in any adjusted position.

By loosening the band wheel 12, the conically bored throat block 8 may be readily adjusted to and away from the jet tube or nozzle 6, so as to thereby increase or diminish the annular passage for the water, according to the requirement of the pressure of steam used in operating the siphon, and by retightening the hand wheel to any point of its adjustment, the said throat block is held stationary in its adjusted position.

The operation of the herein described steam siphon is familiar to those skilled in the art, and it is simply necessary to again note that in operation the device, after being suitably coupled to the proper pipe connections, has the strainer cap thereof immersed in the liquid to be elevated or transferred, and then the steam is jetted through the steam jet or nozzle 6, into the conically bored throat block, to produce the necessary siphoning action, whereby the liquid is lifted through the bowl or casing 1, and conveyed to the point of discharge, and it will, of course, be understood that the liquid combines with the steam in the block or cone 8, so that the necessary condensation is kept up to insure the proper operation of the siphon.

Changes in the form, proportion and the minor details of construction may be resorted to without departing from the principle or sacrificing any of the advantages of this invention.

Having thus described the invention, what is claimed, and desired to be secured by Letters Patent, is—

In a steam siphon, a conical siphon bowl or casing provided at its upper end with a straight-bored cylindrical throat portion, a semi-spherical perforate strainer cap fitted detachably to the enlarged lower end of the bowl or casing, a branch steam pipe leading into one side of the bowl or casing and having an inner upwardly disposed jet tube or nozzle arranged concentric with the throat of the bowl or casing, a conically bored cylindrical throat block fitted to snugly slide in the discharge throat portion of the bowl or casing, and a combined adjusting and fastening device for said block, to provide for moving and securing the same in its adjusted position, substantially as set forth.

In testimony that we claim the foregoing as our own we have hereto affixed our signatures in the presence of two witnesses.

JOHN A. STYNINGER.
MIKLE SCHMALTZ.

Witnesses:
LOUIS S. GRABOWSKY,
SAMUEL MEISTER.